(12) United States Patent  (10) Patent No.: US 8,178,173 B1
Matsumoto et al.  (45) Date of Patent: May 15, 2012

(54) LIQUID CRYSTAL DISPLAY PANEL

(75) Inventors: Toshihiro Matsumoto, Osaka (JP); Mitsuhiro Murata, Osaka (JP); Yuichi Kawahira, Osaka (JP); Masayuki Kanehiro, Osaka (JP); Takanori Takeda, Atsugi (JP); Norihiro Tanaka, Darmstadt (DE); Hideo Ichinose, Odawara (JP)

(73) Assignees: Sharp Kabushiki Kaisha, Osaka (JP); Merck Patent GmbH, Darmstadt (DE)

( * ) Notice: Subject to any disclaimer, the term of this patent is extended or adjusted under 35 U.S.C. 154(b) by 0 days.

(21) Appl. No.: 12/961,019

(22) Filed: Dec. 6, 2010

(51) Int. Cl.
*C09K 19/00* (2006.01)
(52) U.S. Cl. ............... 428/1.1; 252/299.61; 252/299.62; 252/299.63; 349/139; 349/141; 349/143
(58) Field of Classification Search .................. 428/1.1; 252/299.61, 299.62, 199.63; 349/139, 141, 349/143, 129
See application file for complete search history.

(56) References Cited

U.S. PATENT DOCUMENTS

| 6,181,402 B1 | 1/2001 | Shim | |
|---|---|---|---|
| 6,704,083 B1 | 3/2004 | Kim | |
| 2003/0197824 A1* | 10/2003 | Shim et al. | 349/139 |
| 2004/0114084 A1 | 6/2004 | Kim | |
| 2009/0194739 A1* | 8/2009 | Wittek et al. | 252/299.61 |

FOREIGN PATENT DOCUMENTS

JP 10-333171 12/1998

OTHER PUBLICATIONS

Sakurai et al., "Advanced VA Mode with Fast Gray Scale Response and Wide Viewing Angle in a Bend Liquid Crystal Configuration", SID 10 DIGEST, 4 pages, May 2010.

Murata et al., "Advanced VA Mode with Fast Gray Scale Response and Wide Angle in a Bend Liquid Crystal Configuration",, 1a08, 5 pages, May 2010.

* cited by examiner

*Primary Examiner* — Angela Ortiz
*Assistant Examiner* — Ruiyun Zhang
(74) *Attorney, Agent, or Firm* — Nixon & Vanderhye PC

(57) ABSTRACT

A TBA-liquid crystal display panel including a liquid crystal medium with positive dielectric anisotropy, wherein the liquid crystal medium includes, in 100% by weight of the liquid crystal compounds identified by the compounds recited in formulas I through IX below:

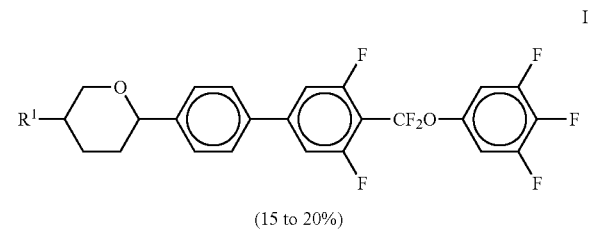

(15 to 20%)

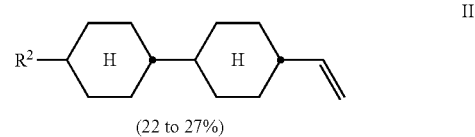

(22 to 27%)

(1 to 5%)

(4 to 8%)

-continued
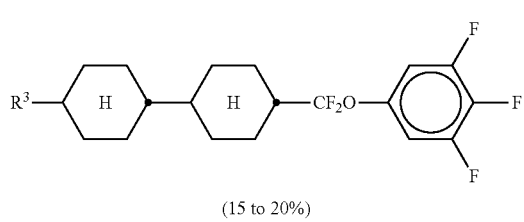
V
(15 to 20%)
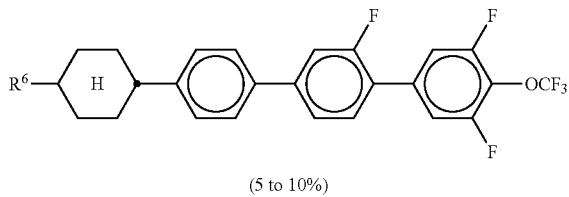
VI
(5 to 10%)
VII
(7 to 10%)
-continued
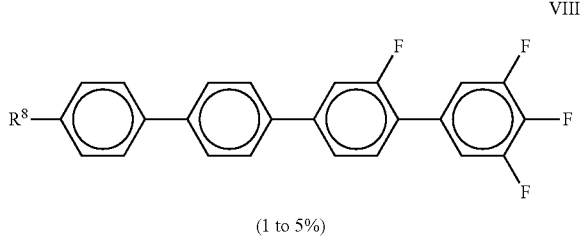
VIII
(1 to 5%)
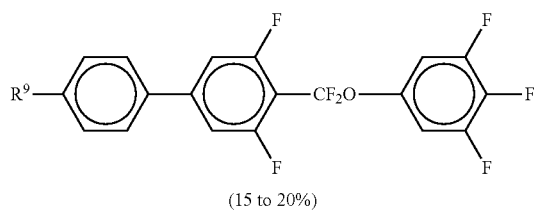
IX
(15 to 20%)
wherein,
$R^1$, $R^3$, $R^{3*}$, $R^5$, $R^6$, $R^7$, $R^8$, and $R^9$ independently denote $C_{2-5}$ linear alkyl, preferably propyl or pentyl,
$R^2$ denote $C_{4-6}$ linear alkyl, preferably butyl or pentyl; and
$R^4$ denotes $C_{1-3}$ linear alkyl, preferably methyl.
17 Claims, 3 Drawing Sheets

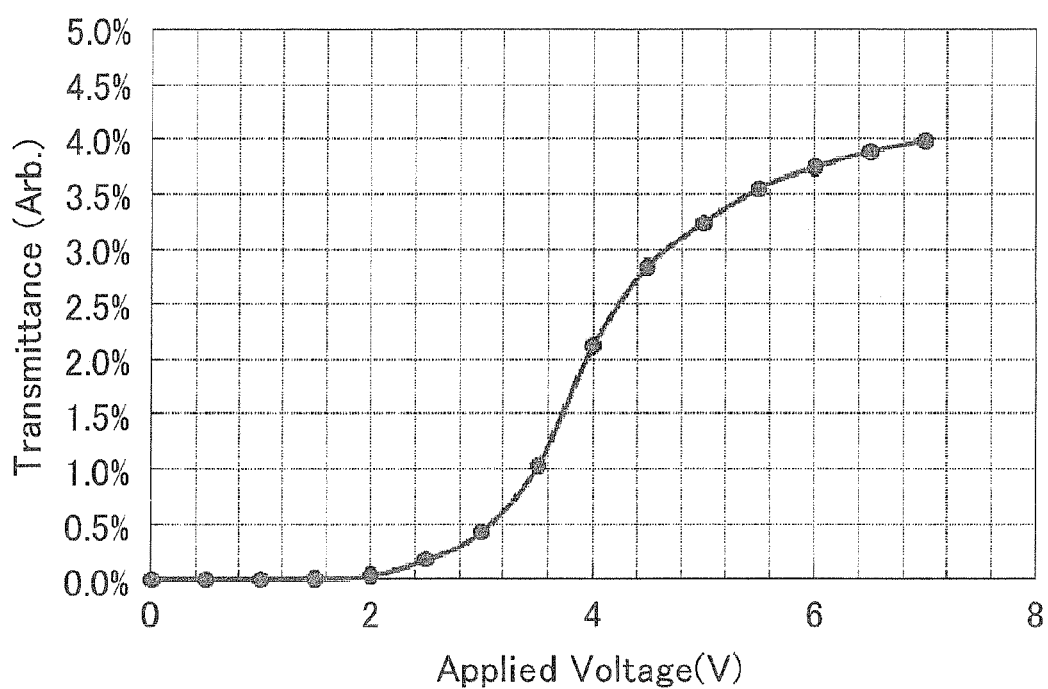

LIQUID CRYSTAL DISPLAY PANEL

BACKGROUND OF THE INVENTION

1. Field of the Invention

The present invention relates to a liquid crystal display (LCD) panel including a liquid crystal (LC) medium with positive dielectric anisotropy (Δ∈).

2. Discussion of the Background

There is a great demand for LCDs, in particular of the matrix type, which have very high specific resistance at the same time as a large working-temperature range, short response times even at low temperatures and low threshold voltage. LC media are required which facilitate the following advantages in LC cells:

extended nematic phase range (in particular down to low temperatures)

the ability to switch at extremely low temperatures (outdoor use, automobile, avionics)

increased resistance to UV radiation (longer service life).

For LC cells, LC media are desired which enable greater multiplexability, lower threshold voltages and broader nematic phase ranges, in particular at low temperatures. A further widening of the available parameter latitude (clearing point, smectic-nematic transition or melting point, viscosity, dielectric parameters, elastic parameters) is also desired. Also, the LC media should have favourable values of ratio of the elastic constants K33/K11.

For TV, mobile and monitor applications, LC media are desired which have a fast response time and a low threshold voltage, furthermore a good LTS (low temperature stability). Also, depending on the thickness of the switchable LC layer, a moderate or high birefringence may be required. However, the LC media known in prior art have the disadvantage that they often do not allow all these requirements to be achieved simultaneously, without negatively affecting the other parameters of the LC cell.

Display mode of LC panels is determined in accordance with how to get LCs in an LC cell to align. TN (Twisted Nematic) mode, MVA (Multi-domain Vertical Alignment) mode, IPS (In-plane Switching) mode, OCB (Optically self-Compensated Birefringence) mode, and the like, are known as conventional LC panel display modes.

Among these, TN-LCD panels have been widely used, but have disadvantages such as slow response time and narrow viewing angle.

Further, an MVA mode (MVA-LCD) also has been known. In this mode, a pixel electrode in an active matrix substrate is provided with slits, and projections (ribs) for LC alignment control are formed on a counter electrode in a counter substrate, and the slits and the projections are used to form a fringe field, thereby aligning LC molecules in multiple different directions. In the MVA mode, each pixel region is divided into plural regions different in alignment direction of LC molecules, and thus multi-domain can be achieved per pixel region. Therefore, a widening of the viewing angle is allowed. Further, the MVA mode is one kind of VA mode, so that it provides contrast ratio (CR) higher than that of the respective TN, IPS, and OCB modes. However, the MVA mode still has room for improvements because it requires complicated production processes, and as in TN mode, has slow response time.

Recently, there has been proposed a TBA (Transverse Bend Alignment) mode where nematic LCs with positive dielectric anisotropy (Δ∈) (hereinafter, also referred to p-type nematic LCs) are used as an LC material, and the initial alignment of the LC molecules is vertical alignment, and comb-like electrodes are used to apply a voltage to the LC medium. In this mode, a pair of comb-like electrodes forms a transverse electric field, and under the influence of this electric field, the alignment behaviour of LC molecules is shown. The TBA mode is one kind of VA mode, so that it provides high contrast ratio. Further, the TBA mode requires no alignment control attributed to projections, and therefore, it has a simple pixel configuration and has excellent viewing angle characteristics.

As an example of the TBA mode, for example, Japanese Kokai Publication No. Hei-10-333171 discloses an LCD panel including: first and second substrates facing each other; a layer of LC materials that are injected between the first and second substrates and that are vertically aligned to the first and second substrates; and at least two electrodes parallel to each other formed in one of the first and second substrates.

SUMMARY OF THE INVENTION

The present invention has the aim of providing a TBA-LCD panel having an LC medium that does not have the above-mentioned disadvantages or only do so to a reduced extent, particularly used for active matrix displays do so to a reduce extent, particularly transistor) type. The LC medium preferably simultaneously has a very high specific resistance, a low threshold voltage, a low rotational viscosity, a broad nematic phase range with high clearing point, an improved LTS and fast switching times. Another aim of the present invention is to extend the pool of LC media available to the expert. Other aims of the present invention are immediately evident from the following description.

Use of the LC medium for TBA-LCD panels allows achieving these aims and also providing excellent display characteristics in terms of both contrast ratio and viewing angle characteristics.

That is, the present invention provides a liquid crystal display panel, including:

first and second substrates facing each other;

a liquid crystal medium with positive dielectric anisotropy, held by the first and second substrates therebetween; and comb-like first and second electrodes disposed in parallel to each other on the first substrate, the liquid crystal medium comprising liquid crystal compounds that align vertically to the first and second substrate surfaces in the absence of applied voltage, wherein the liquid crystal medium comprises, in 100% by weight of all the liquid crystal compounds, 15 to 20% by weight of a compound of formula I,
22 to 27% by weight of a compound of formula II,
1 to 5% by weight of a compound of formula III,
4 to 8% by weight of a compound of formula IV,
15 to 20% by weight of a compound of formula V,
5 to 10% by weight of a compound of formula VI,
7 to 10% by weight of a compound of the formula VII
1 to 5% by weight of a compound of formula VIII, and
15 to 20% by weight of a compound of formula IX,

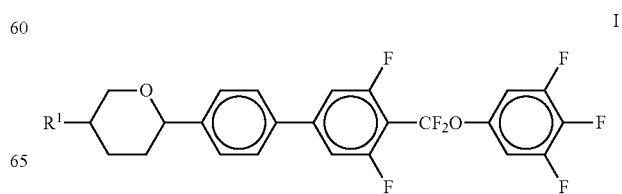

I

-continued

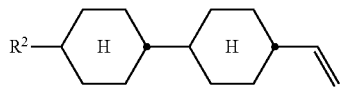
II

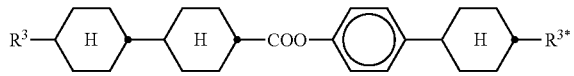
III

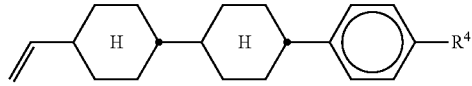
IV

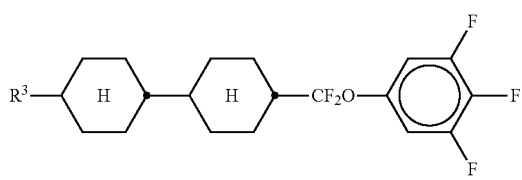
V

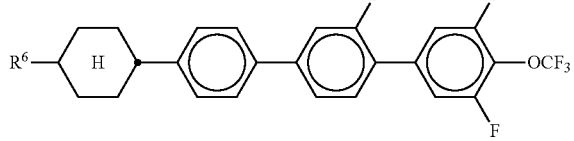
VI

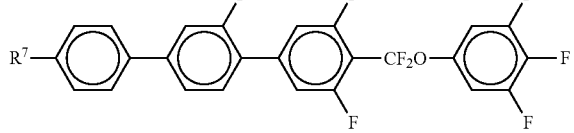
VII

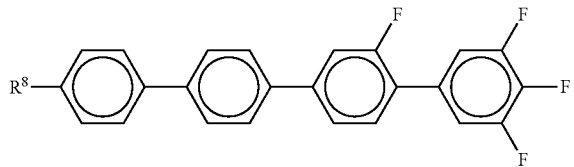
VIII

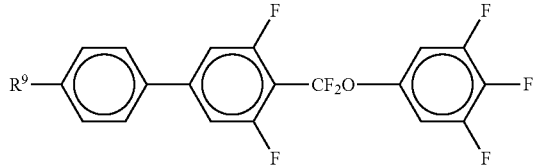
IX in the formulae,
$R^1$, $R^3$, $R^{3*}$, $R^5$, $R^6$, $R^7$, $R^8$, and $R^9$ independently denoting $C_{2-5}$ linear alkyl, preferably propyl or pentyl,
$R^2$ denoting $C_{4-6}$ linear alkyl, preferably butyl or pentyl,
$R^4$ denoting $C_{1-3}$ linear alkyl, preferably methyl.

By combining the above-mentioned LC medium characteristics with high contrast ratio and wide viewing angle characteristics of the TBA mode, an LCD panel with extremely excellent display characteristics that must not be obtained by each alone can be provided.

It is preferable that each of the first and second electrodes has a width L of 1.0 to 4.0 µm. It is preferable that the space between the first and second electrodes is 15.0 µm or less.

If the width L of each of the first and second electrodes and the space S between the first and second electrodes are out of the respective ranges, the transmittance can decrease.

Especially preferably, the LC medium includes one or more compounds selected from the group consisting of the following compounds:

Ia

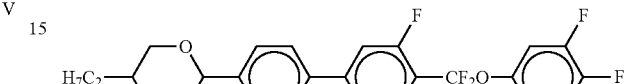
Ib

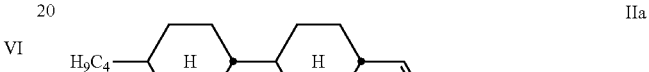
IIa

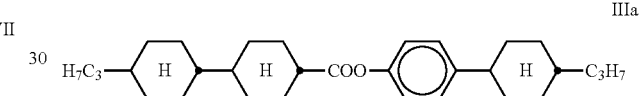
IIb

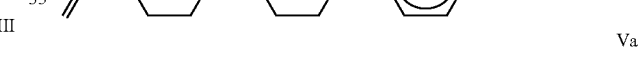
IIIa

IVa

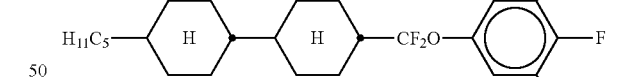
Va

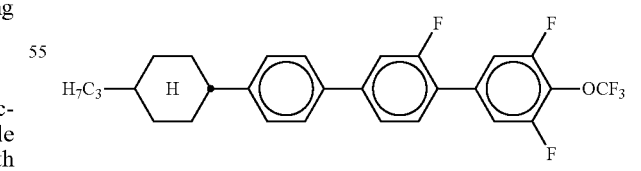
Vb

VIa

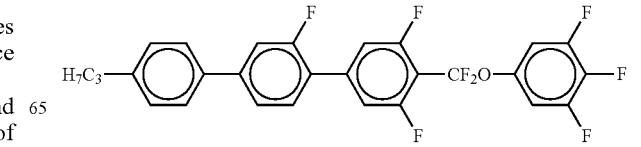
VIIa

-continued

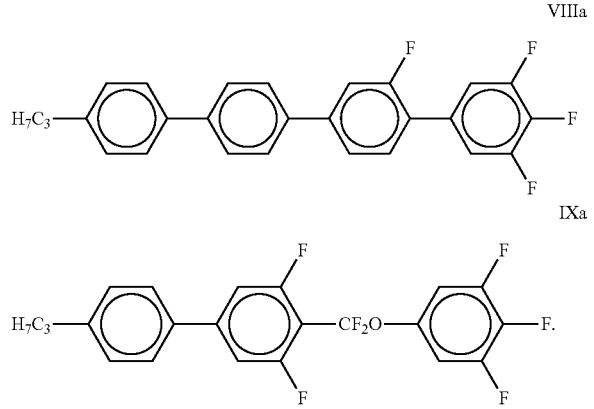

In a preferred embodiment the LC medium essentially consists of the compounds of the formulae I to IX.

In a preferred embodiment the LC medium contains:
7 to 10% by weight of a compound of the formula Ia;
8 to 10% by weight of a compound of the formula Ib;
17 to 20% by weight of a compound of the formula IIa;
5 to 7% by weight of a compound of the formula IIb;
2 to 4% by weight of a compound of the formula IIIa;
5 to 8% by weight of a compound of the formula IVa;
7 to 10% by weight of a compound of the formula Va;
8 to 10% by weight of a compound of the formula Vb;
7 to 9% by weight of a compound of the formula VIa;
7 to 9% by weight of a compound of the formula VIIa;
1.5 to 3.5% by weight of a compound of the formula VIIIa; and
16 to 18% by weight of a compound of the formula IXa.

In a preferred embodiment, the LC medium consists exclusively of the above-mentioned compounds.

The LC medium according to the present invention is characterized by
a broad nematic phase with a very high clearing point,
a low viscosity,
good LTS (low temperature stability)
a low threshold voltage,
high UV stability,
a high value for the positive dielectric anisotropy $\Delta\epsilon$,
a high value for the optical anisotropy $\Delta\epsilon$, whereas the product of $\Delta\epsilon$ and $\Delta\epsilon$ is in the range of 1.3 to 3.1.

In the pure state, the compounds of the formulae I to IX are colorless and form liquid crystal mesophases in a temperature range which is favourably located for electro-optical use. They are stable chemically, thermally and to light.

The compounds of the formulae I to IX are prepared by methods known per se, as descried in the literature (for example in the standard works, such as Houben-Weyl, Methoden der organischen Chemie [Methods of Organic Chemistry], George-Thieme-Verlag, Stuttgart), to be precise under reaction conditions which are known and suitable for the said reactions. Use can also be made here of variants which are known per se, but not mentioned here in greater detail.

The LC mixtures enable a significant widening of the available parameter latitude. Especially, it was found that they have a fast switching time, low threshold voltage, good LTS, high specific resistance, high UV stability and high capacity holding ratio (HR) [as defined in S. Matsumoto et al., Liquid Crystals 5, 1320 (1989); K. Niwa at al., Proc. SID Conference, San Francisco, June 1984, p. 304 (1984); G. Weber et al., Liquid Crystals 5, 1381(1989)]. Also, the achievable combinations of clearing point, rotational viscosity $\gamma_1$, low $\Delta n$ and dielectric anisotropy are superior to materials known from prior art.

The LC mixtures which can be used in accordance with the invention are prepared in a manner conventional per se. In general, a desired amount of the components used in a lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The LC medium may also include further additives known to the person skilled in the art and described in the literature. For example, 0 to 15% by weight of one or more additives selected from the group consisting of pleochroic dyes, stabilizers such as UV stabilizers, and antioxidants can be added to the LC medium.

The following gives the reason why the product of refractive index anisotropy $\Delta\epsilon$ and dielectric anisotropy $\Delta\epsilon$ of the LC medium is preferably in the range of 1.3 to 3.1. When electrodes are disposed in a comb-like pattern as in TBA mode, electric field is difficult to be applied to LC materials compared with other modes. As a result, a higher driving voltage is required. For avoiding this problem, the $\Delta\epsilon$ value is preferably as high as possible. On the other hand, lower viscosity is desired for improvements in response characteristics. Accordingly, for achieving both lower driving voltage and faster response speed, it is important to select well-balanced liquid crystal mixtures that can satisfy these demands. The present inventors found, as a result of the investigations, that in TBA mode like in the present invention, it is preferable that the product $\Delta n \cdot \Delta\epsilon$ is determined within the above-mentioned numeral range. The nematic phase upper limit temperature (TNI) of LC materials is mentioned as the factor for the increase in viscosity, and it is possible to adjust the balance using this temperature as a parameter.

The configuration of the LCD panel of the present invention is not especially limited by other components as long as the LCD panel essentially includes the above-mentioned components. The LCD panel includes, for example, another electrode in addition to the first and second electrodes as an electrode for applying a voltage to the LC medium.

Specifically, preferred embodiments of the LCD panel of the present invention include: (1) the LCD panel includes substantially only the first and second electrodes as an electrode for applying a voltage to the LC medium; and (2) the second substrate includes a third electrode covering the entire display region. The embodiments (1) and (2) are different in direction of the director inside the LC medium. This difference leads to a slight difference in display characteristics between the two embodiments (1) and (2). On the other hand, the two embodiments (1) and (2) are common in that excellent contrast ratio and viewing angle characteristics are achieved.

BRIEF DESCRIPTION OF THE DRAWINGS

FIG. 5 is a graph showing a V-T (voltage-transmittance) curve of a test cell of the LCD panel of Embodiment 3.

DESCRIPTION OF THE EMBODIMENTS

Figure 1:
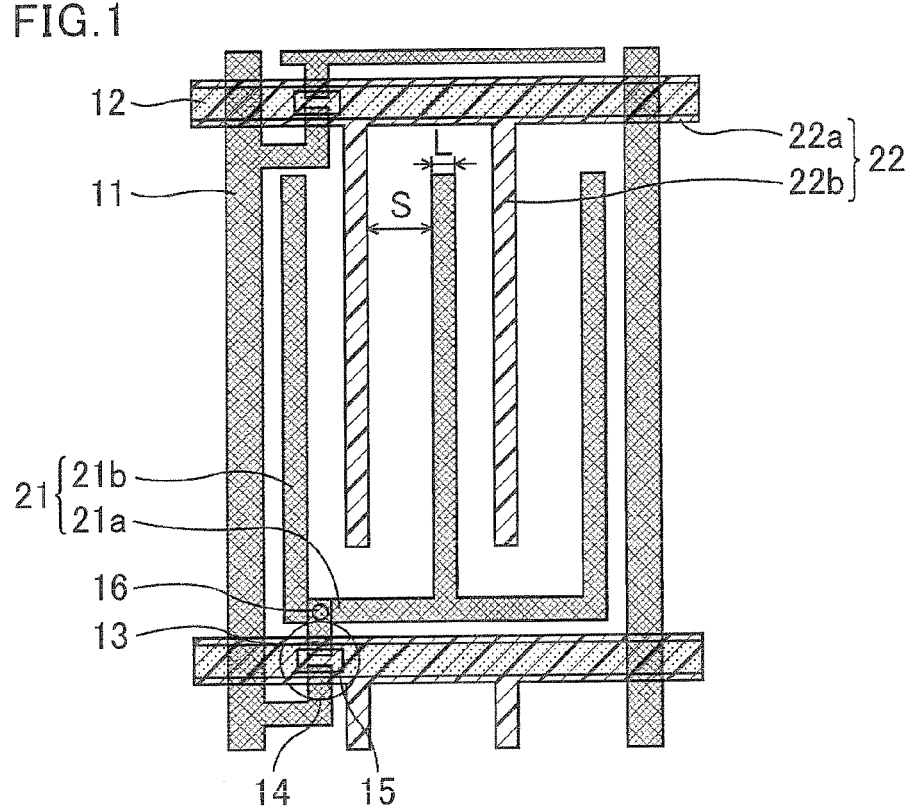
FIG. 1 is a plan view schematically illustrating a configuration per sub-pixel in a TFT substrate of an LCD panel in accordance with Embodiment 1.

The present invention will be mentioned in more detail referring to the drawings in the following embodiments, but is not limited to these embodiments.

Embodiment 1

The LCD panel of Embodiment 1 is a TBA-LCD panel where a pair of electrodes provided in the same substrate forms an arch-like lateral electric field in an LC medium and the alignment of LC molecules whose initial alignment is vertical alignment is controlled, thereby controlling image display.

According to the LCD panel of Embodiment 1, a plurality of pixels each constituted by a plurality of sub-pixels are arranged in a matrix pattern. The LCD panel of Embodiment 1 includes a pair of substrates composed of a TFT substrate and a counter substrate, and an LC medium interposed therebetween. More specifically, the LCD panel of Embodiment 1 includes these members in order of the TFT substrate, the LCD medium, and the counter substrate from the back face side to the observation face side. The LC medium contains nematic LCs with positive dielectric anisotropy ($\Delta\epsilon > 0$).

FIG. 1 is a plan view schematically illustrating a configuration per sub-pixel in a TFT substrate of the LCD panel in accordance with Embodiment 1. As illustrated in FIG. 1, the TFT substrate includes: source lines (signal electrode lines) 11 for transmitting an image signal; gate lines (scanning signal lines) 12 for transmitting a scanning signal; and switching elements, or thin film transistors (TFTs) 14 provided, one per sub-pixel. Each of the TFTs 14 includes: a source electrode 11 connected to any of the source lines 11; a gate electrode 12 connected to any of the gate lines 12; and a drain electrode 13 connected to the source electrode 11 with a semiconductor layer 15 therebetween. The TFT substrate includes a comb-like pixel electrode (first electrode) 21 and a comb-like common electrode (second electrode) 22 for applying a fixed voltage to the LC medium.

The source lines 11 are disposed to linearly extend in parallel to one another. The gate lines 12 are also disposed to linearly extend in parallel to one another. The source lines 11 and the gate lines 12 are disposed to be perpendicular to each other.

The source lines 11 are connected to a source driver, and a source voltage (signal voltage), which is an image signal, is fed from the source driver into the source electrode 11 of the TFT 14. The gate lines 12 are connected to a gate driver, and a gate voltage, which is a scanning signal, is pulse-fed from the gate driver at a specific timing into the TFT 14 in a line-sequential manner.

A drain-extracting line 13 is extended from the drain electrode 13 of the TFT 14. The drain-extracting line 13 and the pixel electrode 21 are disposed in separate layers with an insulating film therebetween, and are connected to each other through a contact part 16 formed in the insulating film. Thus, the TFT 14 is connected to the pixel electrode 21 through the drain-extracting line 13 and the contact part 16. Through the TFT 14 that is switched into an ON-state by a scanning signal input thereto and keeps its state for only a certain period of time, a signal voltage fed from the source line 11 is applied to the pixel electrode 21 at a specific timing.

The common electrode 22 is disposed in a layer different from the layer including the gate line 12 with an insulating film therebetween. The common electrode 22 is disposed to overlap with the gate line 12. Into the common electrode 22, a common voltage that is kept at a certain level is applied.

The pixel electrode 21 includes a main part 21a and a plurality of branched parts 21b extended from part of the main part 21a. The common electrode 22 includes: a main part 22a overlapping with the gate line 12; and a plurality of branched parts 22b extended from part of the main part 22a.

The branched part 21b of the pixel electrode 21 and the branched part 22b of the common electrode 22 are disposed to linearly extend in parallel to each other. The branched part 21b of the pixel electrode 21 and the branched part 22b of the common electrode 22 are disposed to engage with each other with a certain space therebetween. The branched part 21b of the pixel electrode 21 and the branched part 22b of the common electrode 22 are disposed to be also parallel to the source lines 11.

According to the LCD panel of Embodiment 1, a lateral electric field induced between the branched part 21b of the pixel electrode 21 and the branched part 22b of the common electrode 22 controls alignment of LC molecules, and the sub-pixels are each independently controlled by a single TFT 14.

The branched part 21b of the pixel electrode 21 and the branched part 22b of the common electrode 22 are preferably determined to have a width L1 of about 1.0 to 4.0 μm and have a width of L2 of about 1.0 to 4.0 μm, respectively. The L1 and L2 are each more preferably 2.5 to 4.0 μm. The space S between the pixel electrode 21 and the common electrode 22 is not especially limited, and preferably 15.0 μm or less, and more preferably 4.0 to 12.0 μm. If the width L1, L2 and the space S are out of the respective ranges, the transmittance can decrease.

Figure 2:
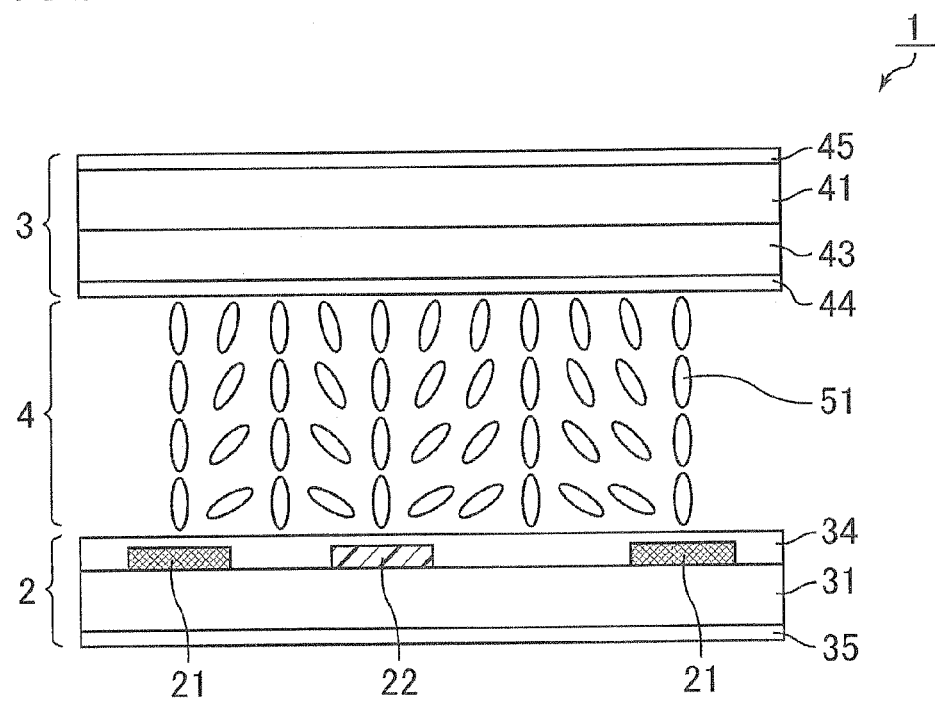
FIG. 2 is a cross-sectional view schematically illustrating a configuration (in the presence of applied voltage) of the LCD panel of Embodiment 1.

FIG. 2 is a cross-sectional view schematically illustrating a configuration (in the presence of applied voltage) of the LCD panel of Embodiment 1. As illustrated in FIG. 2, the LCD panel 1 includes: a TFT substrate (first substrate) 2; a counter substrate (second substrate) 3 facing the TFT substrate 2; and an LC medium 4 interposed therebetween. The LCD panel of Embodiment 1 includes, in addition to such an LCD panel 1, for example, a backlight unit (not shown) disposed on the back-face side of the LCD panel 1.

LC molecules (LC compounds) 51 inside the LC medium 4 show alignment vertical to the substrate surface in the absence of applied voltage. More specifically, rod-liked LC molecules 51 are all aligned in the same direction such that their long axes are in the direction vertical to the substrate surface.

As illustrated in FIG. 2, by applying a voltage between the pixel electrode 21 and the counter electrode 22, the alignment of the LC molecules 51 begins to change along an arch-like lateral electric field formed between these electrodes. Thus, a group of the LC molecules 51, which is influenced by the electric field, shows a bend-pattern alignment symmetrical with respect to the middle region between the pixel electrode 21 and the counter electrode 22. However, as found from FIG. 2, the LC molecules 51 located just above the pixel electrode 21 and the common electrode 22 are kept to be vertically aligned because they are hardly influenced by the electric field change. The LC molecules 51 located in the middle region between the respective electrodes, farthest from the respective electrodes, are also kept to be vertically aligned.

The respective members illustrated in FIG. 2 are mentioned in more detail below. Examples of materials for the insulating substrate (first substrate) 31 include transparent materials of glass, plastic, and the like. Examples of materials for the gate insulating film 32 include transparent insulating materials of silicon oxide, silicon nitride, and the like.

Examples of materials for the source electrode (source line) 11, the gate electrode (gate line) 12, and the drain electrode (drain-extracting line) 13 include metals such as aluminum, tantalum, and molybdenum. The source electrode (source line) 11 and the drain electrode (drain-extracting line) 13 are disposed in the same layer, and therefore when these are made of the same material, the production processes can be simplified.

On the LC medium-side surface of the source electrode (source line) 11 and the drain electrode (drain-extracting line) 13, an interlayer insulating film is formed. Through the contact part 16 formed in the interlayer insulating film, the drain electrode (drain-extracting line) 13 and the pixel electrode 21 are connected to each other.

The interlayer insulating film may be made of an inorganic material or an organic material. The interlayer insulating film may be composed of a plurality of layers of different materials, and these layers may be a multi-layer structure composed of an inorganic insulating layer and an organic insulating layer.

The pixel electrode 21 and the common electrode 22 are disposed in the same layer, and this allows a lateral electric field to be formed at a high density between the pixel electrode 21 and the common electrode 22, and as a result, the LC molecules inside the LC medium can be controlled with high accuracy.

Examples of materials for the pixel electrode 21 and the common electrode 22 include metal oxides such as indium tin oxide (ITO) and indium zinc oxide (IZO), and other metals such as aluminum and chrome. Since the pixel electrode 21 and the common electrode 22 are disposed in the same layer, use of the same material for these electrodes can simplify the production processes. Among the above-mentioned materials, transparent electrodes such as the above-mentioned metal oxides are preferably used in view of increase in transmittance.

On the LC medium side surface of the pixel electrode 21 and the common electrode 22, a vertical alignment film 34 is disposed to cover these electrodes. This vertical alignment film 34 provides the LC molecules with initial tilt vertical (90±0 to 4°) to the TFT substrate surface, and thus, in the absence of applied voltage, vertical alignment can be achieved. The vertical alignment film 34 is made of, for example, resin such as polyimide.

The counter substrate 3, which is disposed facing the TFT substrate 2 with the LC medium 4 therebetween, includes color filter (CF) layers and a black matrix (BM) layer for light-shielding the space between the CF layers. The CF layers are each disposed within a sub-pixel region defined in the TFT substrate. On the LC medium 4-side surface of the CF layers and the BM layer, an overcoat layer 43 for flattening the counter substrate 3 surface is disposed to suppress a variation in the LC molecule alignment. On the LC medium 4-side surface of the overcoat layer 43, no electrodes for applying a voltage to the LC layer are disposed, and instead, the vertical alignment film 44 like in the TFT substrate 2 is disposed directly on the overcoat layer 43.

The BM layer is disposed to overlap with the surrounding of the sub-pixels, i.e., with the source lines 11 and the gate lines 12. The CF layers are used for color display and made of, for example, a pigment-containing transparent organic resin such as acrylic resin. The CF layers are disposed such that the location of each CF layer corresponds to the location of each sub-pixel, specifically, such that the CF layers overlap with the regions surrounded by the common electrode 22, respectively.

Examples of materials for the insulating substrate (second substrate) 41 include transparent insulating materials of glass, plastic, and the like. Examples of materials for the BM layer include light-shielding metals such as chrome (Cr), and light-shielding organic films of carbon-containing acrylic resin and the like.

Examples of materials for the overcoat layer 43 include transparent insulating materials such as an inorganic insulating film of silicon nitride and the like and an organic insulating film of acrylic resin and the like.

Thus, the LCD panel of Embodiment 1 is a color LCD panel including the counter substrate 3 with the CF layers, and each pixel is constituted by three sub-pixels which output respective colors of red (R), green (G), blue (B), and the like. In Embodiment 1, the colors and number of the sub-pixels constituting the respective pixels are not especially limited and appropriately determined. The respective pixels may be constituted by three sub-pixels of cyan (C), magenta (M), and yellow (Y), or four sub-pixels of different colors.

The TFT substrate 2 and the counter substrate 3 are attached to each other with a sealant applied along the periphery of the display region, and spacers such as plastic beads are provided between the TFT substrate 2 and the counter substrate 3.

On a surface on the side opposite to the LC medium 4 of the insulating substrate 31 of the TFT substrate 2, a polarizer 35 is attached. On a surface on the side opposite to the LC medium 4 of the insulating substrate 41 of the counter substrate 3, a polarizer 45 is attached. The transmission axes of these polarizers 35 and 45 are orthogonal to each other, i.e., in cross-Nicol arrangement. The polarizer 35 on the TFT substrate 2 side and the polarizer 45 on the counter substrate 3 side are each arranged that its transmission axis makes an angle of 45° with respect to the longitudinal direction of each of the branched part 21b of the pixel electrode 21 and the branched part 22b of the common electrode 22. The LCD panel of Embodiment 1 may be provided with optical films such as retardation film, viewing angle Compensation film, and the like, in addition to these polarizers 35 and 45.

Hereinafter, an LC mixture used in Embodiment 1 is mentioned in detail.

In the present embodiment and in the example below, the structures of the LC compounds in the LC medium are indicated by the following acronyms.

Particular preference is given to LC mixtures which include

LC compounds selected from Table A:

TABLE A (n and m: each independently from each other are 1, 2, 3, 4, or 5)

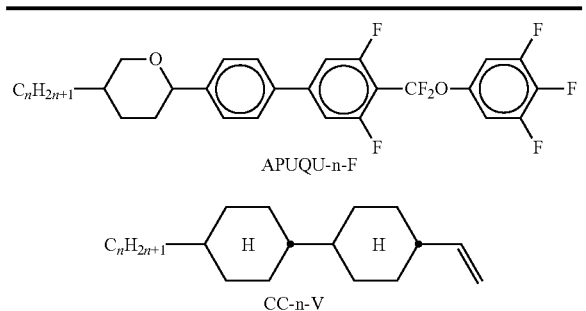

TABLE A-continued
(n and m: each independently from each other are 1, 2, 3, 4, or 5)
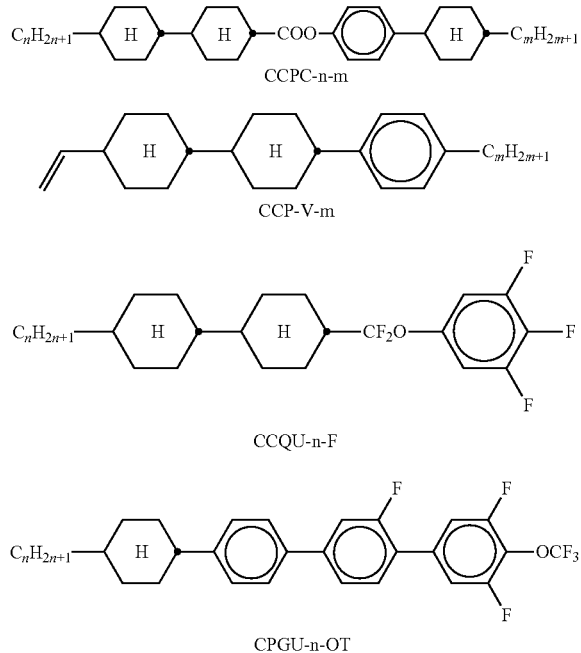
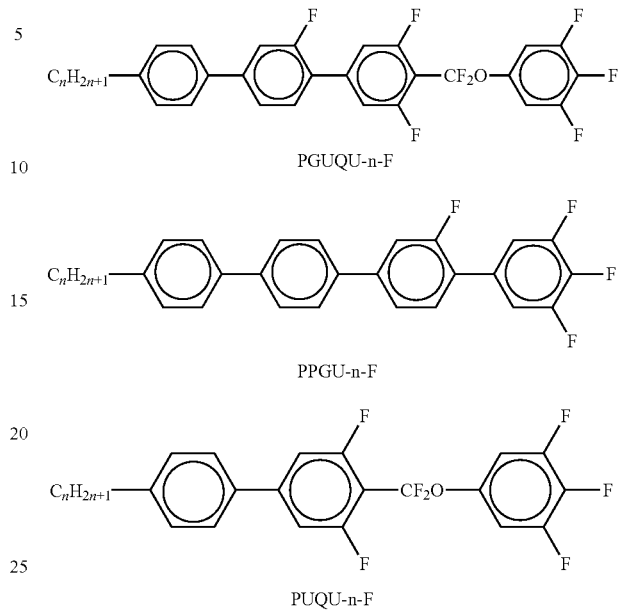
The following Table B shows possible stabilizers that can be added to the LC medium according to the present embodiment.
TABLE B
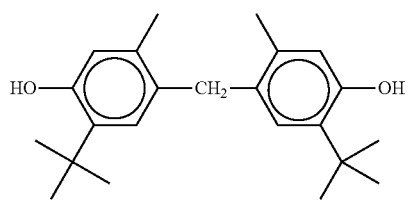
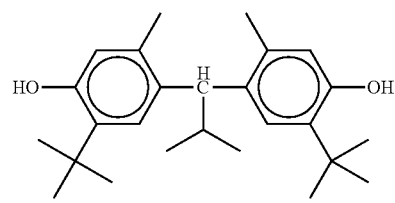
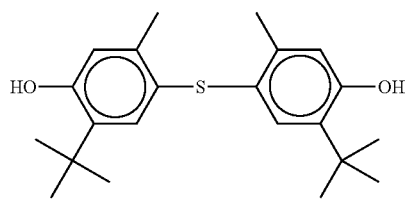
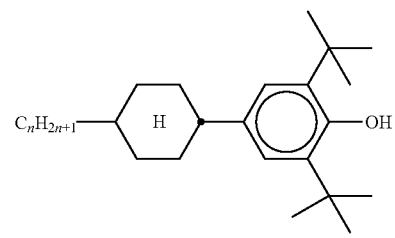
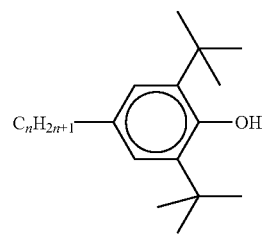
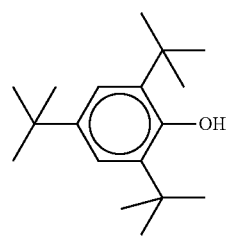

TABLE B-continued
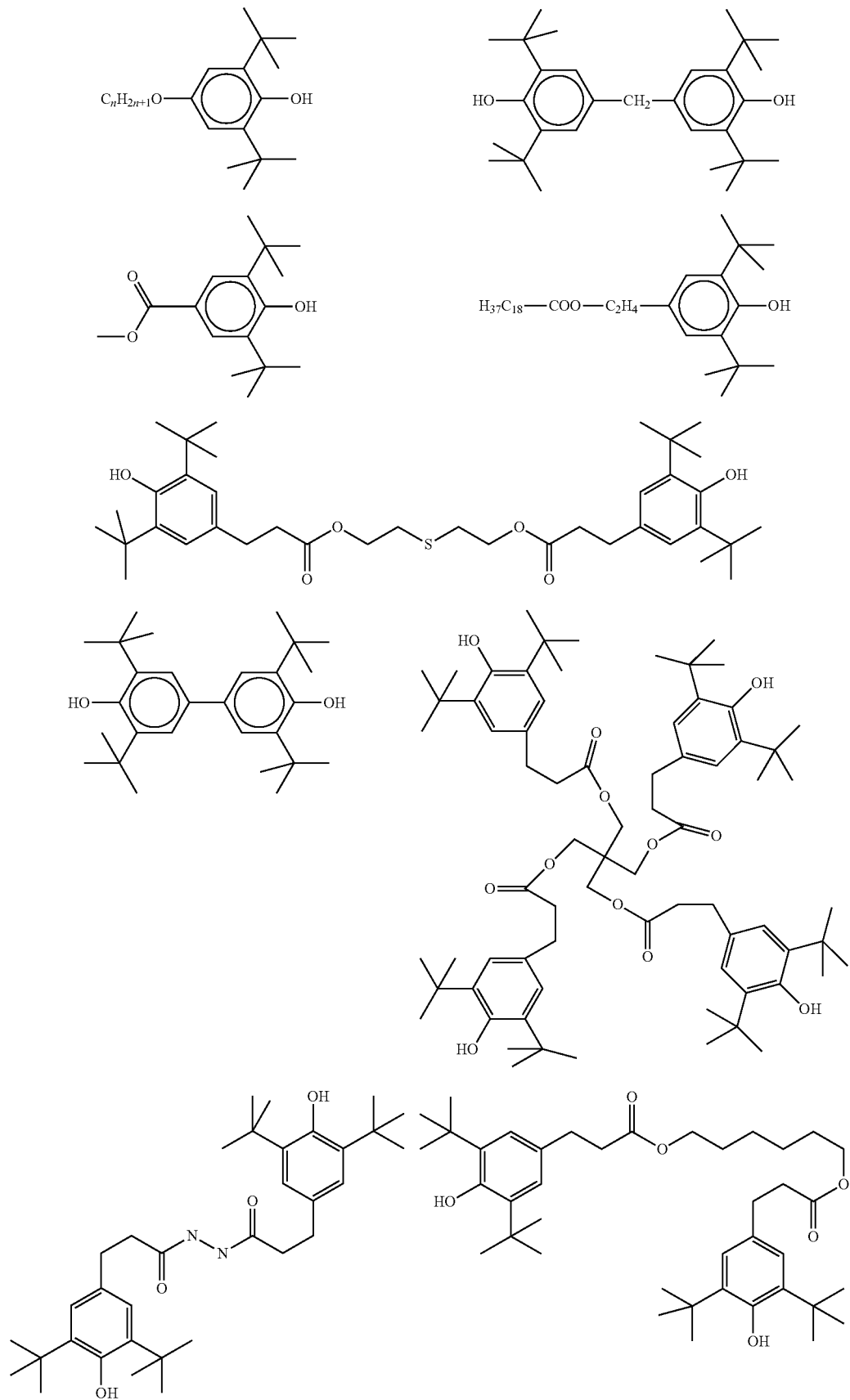

TABLE B-continued
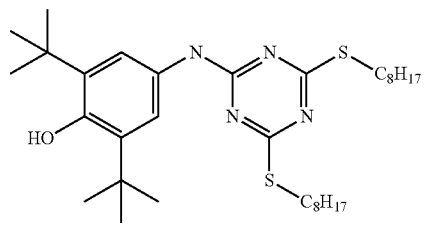
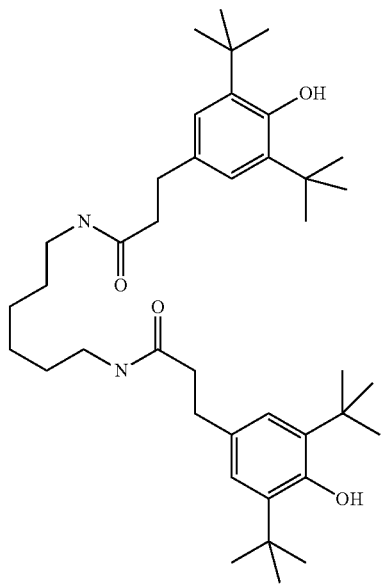
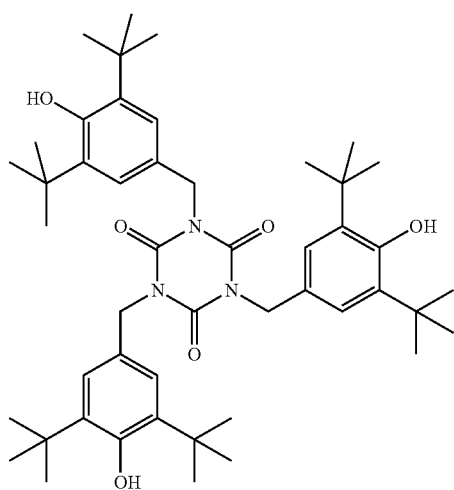
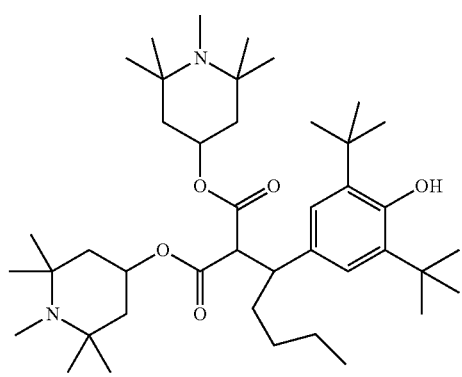
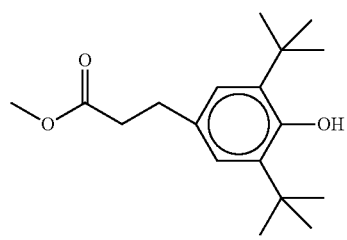
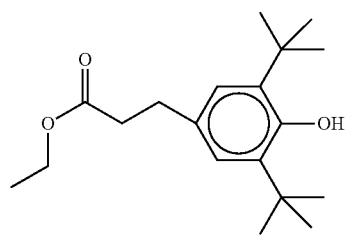
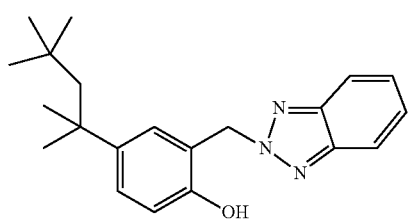
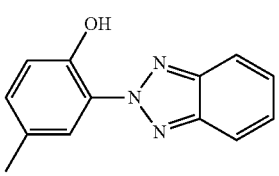

TABLE B-continued
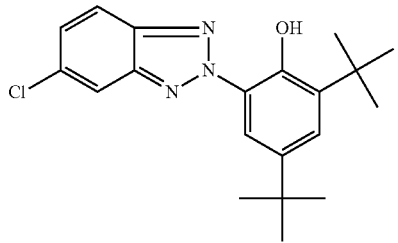 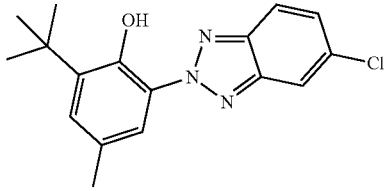
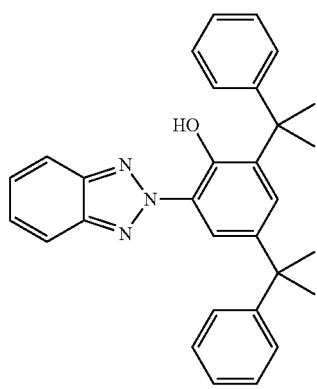 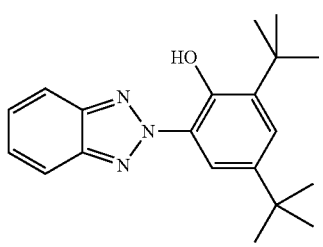
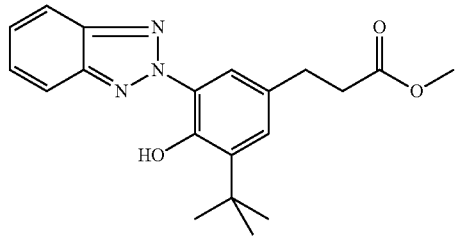 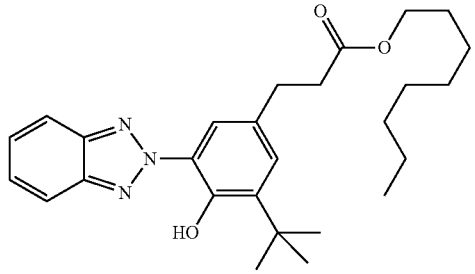
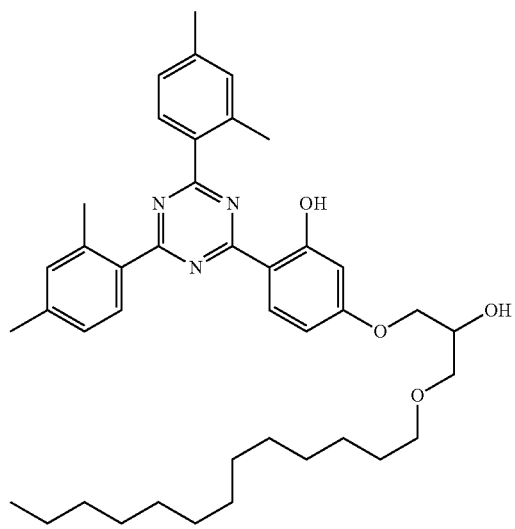 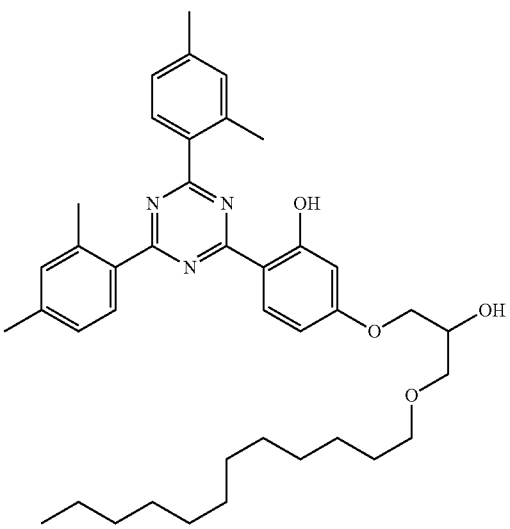

TABLE B-continued

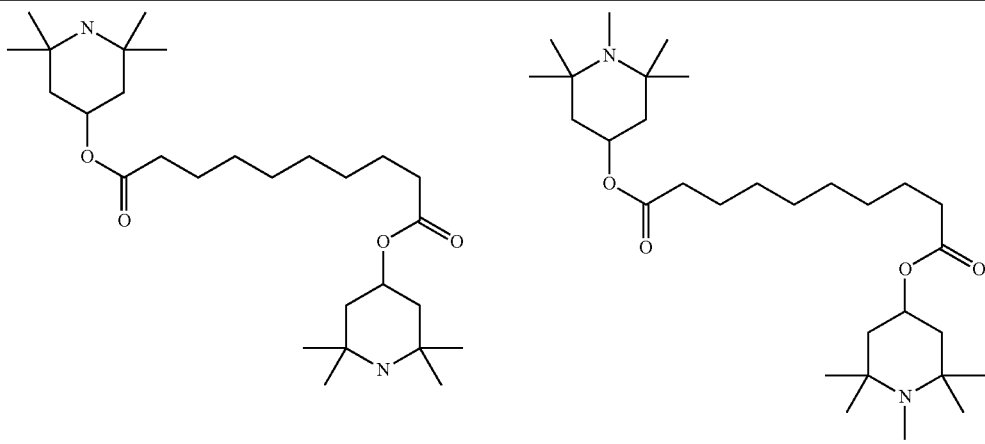

All temperatures are given in degrees Celsius. m.p. denotes melting point, cl.p=clearing point. Furthermore, C=crystal state, N=nematic phase, S=smectic phase, and I=isotropic phase. The data between these symbols represent the transition temperatures. The optical data are measured at 20° C., unless expressly stated otherwise.

In the present description, the term "threshold voltage" relates to the capacitive threshold ($V_0$), also known as the Freedericks threshold, unless explicitly indicated otherwise.

All physical properties are and have been determined in accordance with "Merck Liquid Crystals, Physical properties of Liquid Crystals", status November 1997, Merck KGaA, Germany, and apply to a temperature of 20° C., and $\Delta n$ is determined at 589 nm and $\Delta \epsilon$ at 1 kHz, unless explicitly indicated otherwise in each case.

The voltage holding ratio is determined in test cells produced at Merck Japan Ltd. The measurement cells have alkaline free glass substrates and are constructed with polyimide alignment layers (SE7492 from NISSAN CHEMICAL INDUSTRIES, LTD.) with a layer thickness of 50 nm, which have been rubbed perpendicular to one another. The layer thickness is uniformly 6.0 μm. The surface area of the transparent electrodes of ITO is 1 cm².

The voltage holding ratio is determined after 30 minutes in the oven at 70° C. ($HR_{70}$). The voltage used has a frequency of 60 Hz.

The rotational viscosity is determined using the transient current method and the flow viscosity in a modified Ubbelohde viscometer. For liquid crystal mixtures ZLI-2293, ZLII-4792, and MLC-6608, all products from Merck KGaA, Darmstadt, Germany, the rotational viscosity values determined at 20° C. are 161 mPa·s, 133 mPa·s, and 186 mPa·s, respectively, and the flow viscosity values are 21 mm²·S⁻¹, 14 mm²·S⁻¹, and 27 mm²·S⁻¹, respectively.

The following symbols are used in the present description:

| | |
|---|---|
| $V_0$ | threshold voltage, capacitive [V] at 20° C. |
| ne | extraordinary refractive index measured at 20° C. and 589 nm |
| no | ordinary refractive index measured at 20° C. and 589 nm |
| $\Delta n$ | optical anisotropy measured at 20° C. and 589 nm |
| $\epsilon \perp$ | dielectric susceptibility perpendicular to the director at 20° C. and 1 kHz |
| $\epsilon \parallel$ | dielectric susceptibility parallel to the director at 20° C. and 1 kHz, |

-continued

| | |
|---|---|
| $\Delta \epsilon$ | dielectric anisotropy at 20° C. and 1 kHz, ($\Delta \epsilon = \epsilon \parallel - \epsilon \perp$, where $\epsilon \parallel$ denotes the dielectric constant parallel to the longitudinal molecular axes and $\epsilon \perp$ denotes the dielectric constant perpendicular thereto) |
| $\gamma_1$ | rotational viscosity measured at 20° C. [mPa·s] |
| $K_1$ | elastic constant, "spray" deformation at 20° C. [pN] |
| $K_2$ | elastic constant, "twist" deformation at 20° C. [pN] |
| $K_3$ | elastic constant, "bend" deformation at 20° C. [pN] |
| LTS | low-temperature stability (phase stability) determined in test cells |
| $V_{10}$ | voltage for 10% transmission (viewing angle perpendicular to the plate surface) |

The electro-optical date are measured in a TN cell at the 1st minimum (i.e. at a d·$\Delta n$ value of 0.5 μm) at 20° C., unless expressly stated otherwise.

The following example explains the LC mixture in the LC medium of the present embodiment.

EXAMPLE 1

| | | | |
|---|---|---|---|
| CCQU-3-F | 9.00% | Clearing point [° C.]: | 94.5 |
| CCQU-5-F | 9.00% | $\Delta n$[589 nm, 20° C.]: | 0.1214 |
| PUQU-3-F | 16.00% | $\Delta \epsilon$[1 kHz, 20° C.]: | +20.4 |
| APUQU-2-F | 8.00% | $\gamma_1$[mPa·s] | 184 |
| APUQU-3-F | 9.00% | $V_0$[V, 20° C.]: | 0.81 |
| PGUQU-3-F | 8.00% | | |
| CPGU-3-OT | 7.00% | | |
| CC-4-V | 18.00% | | |
| CC-5-V | 5.00% | | |
| CCP-V-1 | 6.00% | | |
| CCPC-33 | 3.00% | | |
| PPGU-3-F | 2.00% | | |

Embodiment 2

Figure 3:
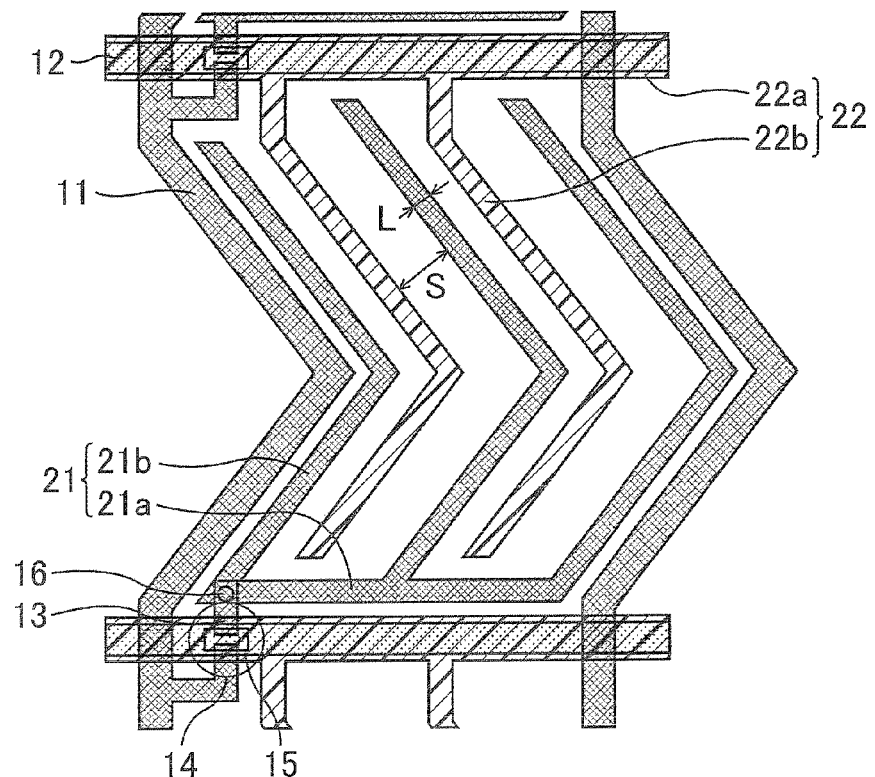
FIG. 3 is a plan view schematically illustrating a configuration per sub-pixel in a TFT substrate of an LCD panel in accordance with Embodiment 2.

FIG. 3 is a plan view schematically illustrating a configuration per sub-pixel of a TFT substrate of an LCD panel in Embodiment 2. The LCD panel in Embodiment 2 is the same as that in Embodiment 1, except that the source line 11, the branched part 21b of the pixel electrode 21, and the branched part 22b of the common electrode 22 are each formed not in a linear pattern but in a V pattern per sub-pixel. Further, the source line 11, which is formed over a plurality of sub-pixels, forms a zig-zag pattern in the entire substrate plane. In Embodiment 2, the pair of polarizers is disposed such that the azimuths of their polarization axes are in the same relationship as in Embodiment 1, specifically, in parallel or orthogonal to the extending direction of the gate lines 12.

The above-mentioned V-shaped part has such a shape as extending two opposite directions from the line bisecting the longitudinal side of the sub-pixel, and the portion extending to one direction and the portion extending to the other direction are symmetrical with respect to the line. This structure allows the LC molecules to align in directions oblique to the outer frame line of the sub-pixel so that regions different in alignment azimuth of the LC molecules from one another are formed to have equal areas. As a result, the viewing angle characteristics can be further improved.

Embodiment 3

The LCD panel of Embodiment 3 is a TBA-LCD panel where an electrode provided in a counter substrate as well as a pair of electrodes provided in the same substrate forms an electric field in an LC medium and the alignment of LC molecules whose initial alignment is vertical alignment is controlled, thereby controlling image display.

Figure 4:
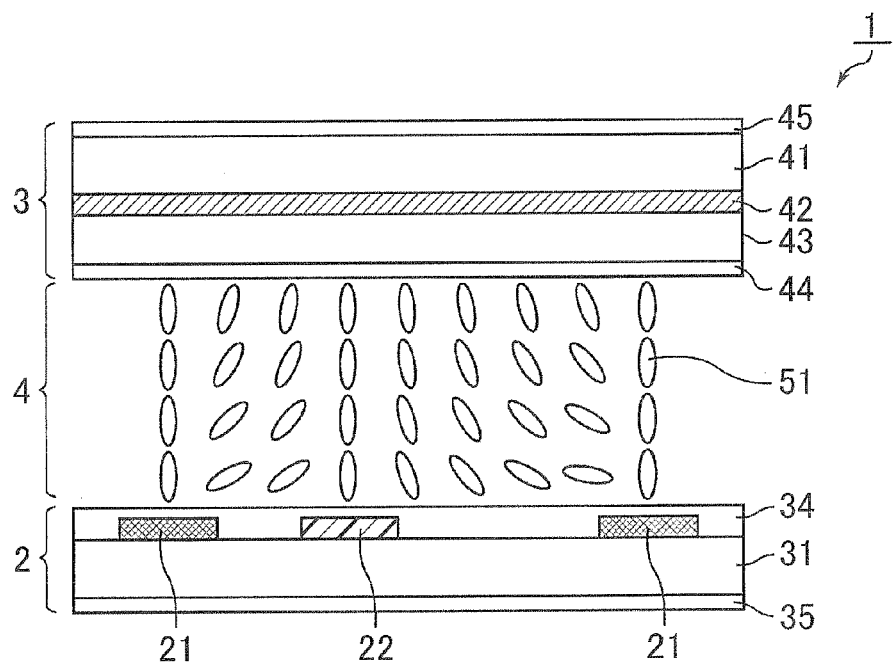
FIG. 4 is a cross-sectional view schematically illustrating a configuration of an LCD panel of Embodiment 3.

FIG. 4 is a cross-sectional view schematically illustrating a configuration of the LCD panel of Embodiment 3. As illustrated in FIG. 4, the LCD panel of Embodiment 3 includes a pair of substrates composed of a TFT substrate and a counter substrate. The LCD panel of Embodiment 3 is different from those of Embodiments 1 and 2 in that the panel includes a counter electrode (third electrode) 42 provided in the counter substrate 3. Specifically, as illustrated in FIG. 4, the counter substrate 3 in Embodiment 3 includes an insulating substrate 41, and further includes a counter electrode 42, an overcoat layer 43, and a vertical alignment film 44 stacked on the insulating substrate 41 in this order toward the LC medium 4. CF layers and a BM layer may be provided between the counter electrode 42 and the insulating substrate 41.

Examples of materials for the counter electrode 42 include metal oxides such as ITO and IZO. The counter electrode 42 is formed to cover substantially the entire display region without electrical disconnection. The overcoat layer 43 is also formed to cover substantially the entire display region. To the counter electrode 42, a specific electric potential that is common to all the pixel electrodes is applied.

The TFT substrate 2 includes an insulating substrate 31 as a base, and further includes a pixel electrode 21, a common electrode 22, and a vertical alignment film 34 similarly in Embodiments 1 and 2 on the insulating substrate 31. Polarizers 35 and 45 are disposed on the outer surfaces of the TFT substrate 2 and the counter substrate 3, respectively, the outer surfaces being surfaces on the side opposite to the LC medium 4 side of the respective substrates 2 and 3.

Except during black-screen display, a voltage applied to the pixel electrode 21 is different from voltages each applied to the common electrode 22 and to the counter electrode 42. The voltages applied to the common electrode 22 and to the counter electrode 42 may be at the same or different levels from each other, and may be with the same or different polarities. The common electrode 22 and the counter electrode 42 may be both grounded.

As illustrated in FIG. 4, the LC molecules in the LCD panel of Embodiment 3 exhibit alignment different form that of the molecules in the LCD panel of Embodiment 1. Specifically, the alignment behaviour is not bend alignment where LC molecules are aligned in an arch pattern, but alignment where some of the LC molecules are drawn to the counter substrate. Accordingly, unlike in Embodiment 1, the LC molecules located in the middle region between the electrodes does not maintain its vertical alignment and shows alignment oblique to the substrate surface. Thus, according to Embodiment 3, the number of dark lines can be decreased compared with the case in Embodiment 1, and the transmittance can be enhanced.

Even in the LCD panel of Embodiment 3, similarly in Embodiment 1, generation of uneven display can be suppressed. Further, the response time can be improved attributed to the counter electrode 42.

Characteristic Evaluation

The LCD panel of Embodiment 3 was evaluated for optical characteristics, specifically, V-T (voltage-transmittance) and response time.

FIG. 5 is a graph showing a V-T (voltage-transmittance) curve of a test cell of the LCD panel of Embodiment 3. As illustrated in FIG. 5, the transmittance (T) of the LCD panel increases in proportion to an increase in applied voltage (V), but over a certain voltage level, it gently increases. According to Embodiment 3, the threshold voltage was 2V, and thus the driving voltage could be reduced, and the transmittance at 6.5V was 4%. The response time was significantly improved from 16.7 msec, which is an indication of acceptance of conventional LCD panels. Specifically, the rise time (from black to white) was 9.5 msec, and the fall time (from white to black) was 5.5 msec. The "black" in this evaluation means a state at room temperature and at 0V, and the "white" in this evaluation means a state at room temperature and at 6.5 V. In characteristics evaluation in LCD panel with the same configuration as in the LCD panel of Embodiment 3, prepared using conventional LC materials, optical characteristics equivalent to those mentioned above could not be achieved.

The LCD panel of Embodiment 1 is also evaluated for characteristics. A comparison between Embodiments 1 and 3 shows that in the LCD panel of Embodiment 3, the steepness of the V-T curve was smaller, i.e., moderate curve. This comparison result indicates that when these LCD panels of Embodiments 1 and 3 are in normally black mode, uneven display is less likely to occur in the LCD panel of Embodiment 3. Further, in Embodiment 3, the transmittance began to increase from a lower voltage, and therefore the panel could be driven even at a lower voltage.

Further, in Embodiment 1, the LC molecules located above and between the electrodes are vertically aligned even in the presence of applied voltage. In contrast, in Embodiment 3, the LC molecules located between the electrodes disposed in a comb-like pattern are not vertically aligned, and therefore, the number of dark lines, which were generated in Embodiment 1, can be decreased, and as a result, the transmittance could be improved.

On the other hand, according to the LCD panel of Embodiment 1, the voltage applied to the common electrode (flicker elimination) can be easily adjusted, which makes it possible to suppress generation of after-images and image sticking compared with Embodiment 3. Further, the LCD panel of Embodiment 1 can achieve a large manufacturing margin and cost-effective manufacturing.

What is claimed is:

1. A liquid crystal display panel, comprising:
   first and second substrates facing each other;
   a liquid crystal medium with positive dielectric anisotropy, held by the first and second substrates therebetween; and
   comb-like first and second electrodes disposed in parallel to each other on the first substrate,
   the liquid crystal medium comprising liquid crystal compounds that align vertically to the first and second substrate surfaces in the absence of applied voltage,
   wherein the liquid crystal mediums consists essentially of, in 100% by weight of all the liquid crystal compounds, 15 to 20% by weight of a compound of formula I,
22 to 27% by weight of a compound of formula II,
1 to 5% by weight of a compound of formula III,
4 to 8% by weight of a compound of formula IV,
15 to 20% by weight of a compound of formula V,
5 to 10% by weight of a compound of formula VI,
7 to 10% by weight of a compound of the formula VII
1 to 5% by weight of a compound of formula VIII, and
15 to 20% by weight of a compound of formula IX, I
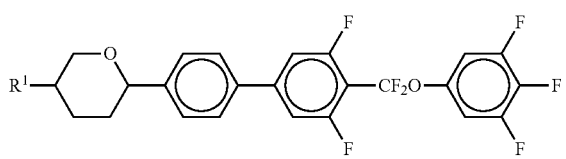

II
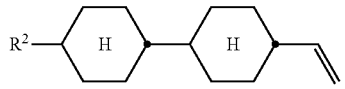

III
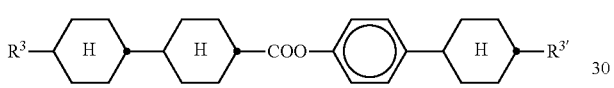

IV
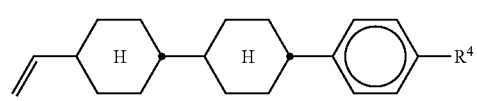

V
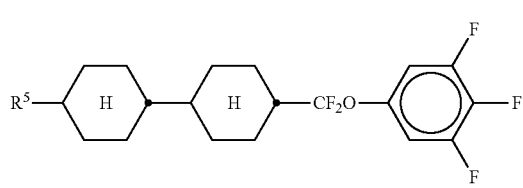

VI
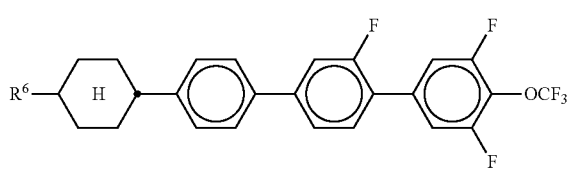

VII
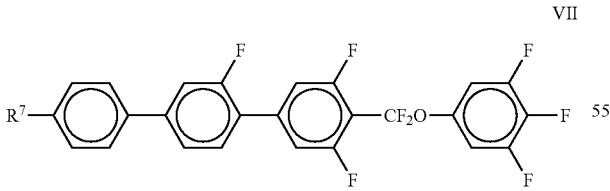

VIII
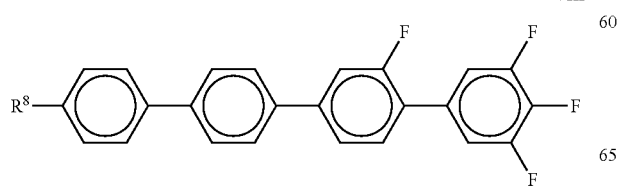

IX
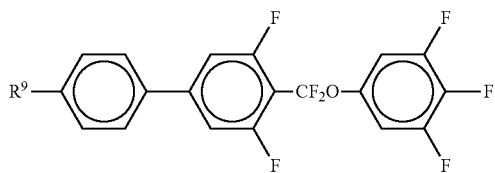

in the formulae,
$R^1, R^3, R^{3*}, R^5, R^6, R^7, R^8$, and $R^9$ independently denoting $C_{2-5}$ linear alkyl,
$R^2$ denoting $C_{4-6}$ linear alkyl,
$R^4$ denoting $C_{1-3}$ linear alkyl.

2. The liquid crystal display panel according to claim 1, wherein each of the first and second electrodes has a width of 1.0 to 4.0 μM.

3. The liquid crystal display panel according to claim 1, wherein the space between the first and second electrodes is 15.0 μm or less.

4. The liquid crystal display panel according to claim 1, wherein the product of refractive index anisotropy Δn and dielectric anisotropy Δ∈ of the liquid crystal medium is in the range of 1.3 to 3.1.

5. The liquid crystal display panel according to claim 1, wherein the liquid crystal display panel uses substantially only the first and second electrodes as an electrode for applying a voltage to the liquid crystal medium.

6. The liquid crystal display panel according to claim 1, wherein the second substrate includes a third electrode covering the entire display region.

7. The liquid crystal display panel according to claim 1, wherein the liquid crystal medium comprises at least one of a compound of the formula Ia and a compound of the formula Ib:

Ia
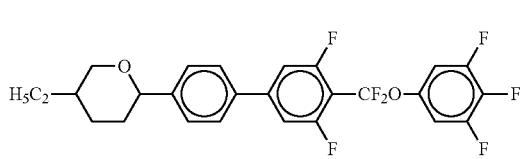

Ib
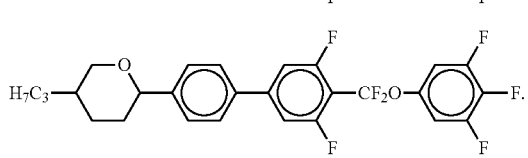

8. The liquid crystal display panel according to claim 1, wherein the liquid crystal medium comprises at least one of a compound of the formula IIa and a compound of the formula IIb:

IIa
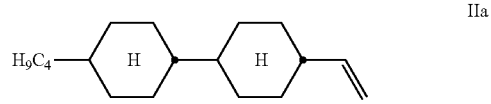

IIb
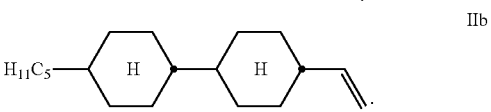

9. The liquid crystal display panel according to claim 1, wherein the liquid crystal medium comprises a compound of the formula IIIa:

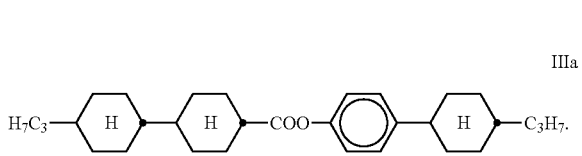
IIIa

10. The liquid crystal display panel according to claim 1, wherein the liquid crystal medium comprises a compound of the formula IVa:

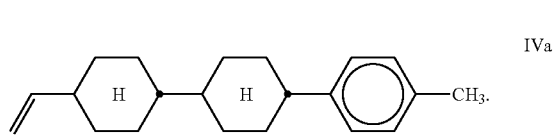
IVa

11. The liquid crystal display panel according to claim 1, wherein the liquid crystal medium comprises at least one of a compound of the formula Va and a compound of the formula Vb:

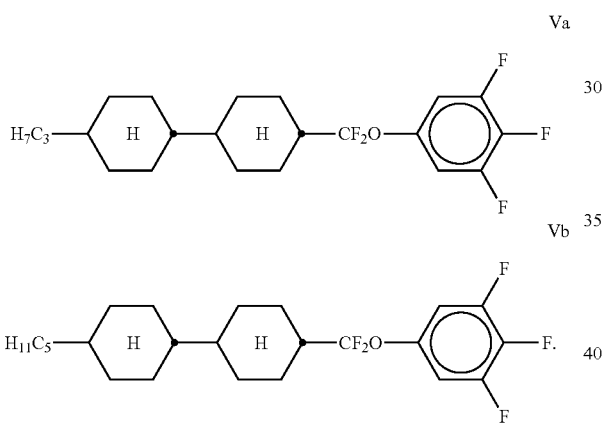
Va

Vb

12. The liquid crystal display panel according to claim 1, wherein the liquid crystal medium comprises a compound of the formula VIa:

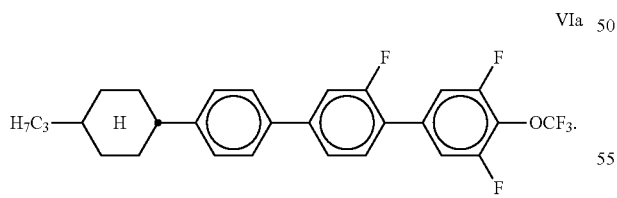
VIa

13. The liquid crystal display panel according to claim 1, wherein the liquid crystal medium comprises a compound of the formula VIIa:

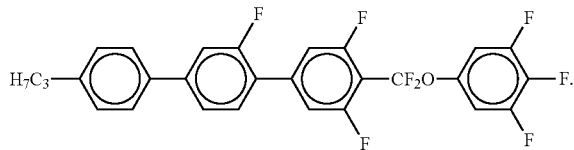
VIIa

14. The liquid crystal display panel according to claim 1, wherein the liquid crystal medium comprises a compound of the formula VIIIa:

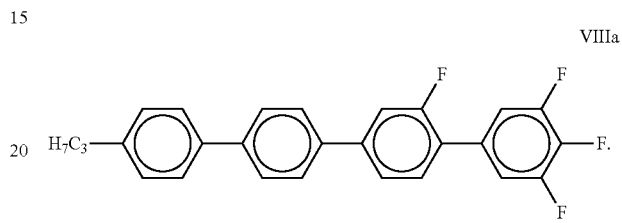
VIIIa

15. The liquid crystal display panel according to claim 1, wherein the liquid crystal medium comprises a compound of the formula IXa:

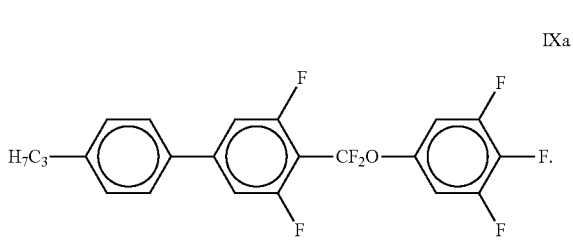
IXa

16. The liquid crystal display panel according to claim 1, wherein the liquid crystal medium comprises, in 100% by weight of all the liquid crystal compounds,
7 to 10% by weight of a compound of the formula Ia, 8 to 10% by weight of a compound of the formula Ib,
17 to 20% by weight of a compound of the formula IIa, 5 to 7% by weight of a compound of the formula IIb,
2 to 4% by weight of a compound of the formula IIIa,
5 to 8% by weight of a compound of the formula IVa,
7 to 10% by weight of a compound of the formula Va,
8 to 10% by weight of a compound of the formula Vb,
7 to 9% by weight of a compound of the formula VIa,
7 to 9% by weight of a compound of the formula VIIa,
1.5 to 3.5% by weight of a compound of the formula VIIIa, and
16 to 18% by weight of a compound of the formula IXa.

17. The liquid crystal display panel according to claim 1, wherein the liquid crystal medium comprises one or more additives selected from the group consisting of pleochroic dyes, UV stabilizers and antioxidants.

\* \* \* \* \*